(12) United States Patent
Busker (10) Patent No.: US 12,331,725 B2
(45) Date of Patent: Jun. 17, 2025

(54) METHOD AND WINDFARM CONTROL STAGE FOR CONTROLLING A WINDFARM

(71) Applicant: Wobben Properties GmbH, Aurich (DE)

(72) Inventor: Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/078,910

(22) PCT Filed: Feb. 23, 2017

(86) PCT No.: PCT/EP2017/054147
§ 371 (c)(1),
(2) Date: Aug. 22, 2018

(87) PCT Pub. No.: WO2017/144576
PCT Pub. Date: Aug. 31, 2017

(65) Prior Publication Data
US 2019/0055926 A1    Feb. 21, 2019

(30) Foreign Application Priority Data

Feb. 23, 2016    (DE) ............ 10 2016 103 101.1

(51) Int. Cl.
*F03D 7/04* (2006.01)
*F03D 7/02* (2006.01)
*F03D 9/11* (2016.01)

(52) U.S. Cl.
CPC .......... *F03D 7/048* (2013.01); *F03D 7/0284* (2013.01); *F03D 7/046* (2013.01); *F03D 9/11* (2016.05);
(Continued)

(58) Field of Classification Search
CPC . F03D 7/048; F03D 7/046; F03D 9/11; F03D 7/0284; Y02E 10/723;
(Continued)

(56) References Cited

U.S. PATENT DOCUMENTS 7,168,251 B1    1/2007    Janssen
7,982,325 B2    7/2011    Andersen
(Continued)

FOREIGN PATENT DOCUMENTS

CN    101483344 A    7/2009
CN    103190054 A    7/2013
(Continued)

OTHER PUBLICATIONS

Hansen et al., "Centralised power control of wind farm with doubly fed induction generators," *Renewable Energy* 31(7):935-951, Jun. 2006. (17 pages).

*Primary Examiner* — Tameem D Siddiquee
(74) *Attorney, Agent, or Firm* — Seed IP Law Group LLP (57) ABSTRACT

A method for controlling a windfarm having a plurality of wind power installations and feeding into an electrical supply network at a network connection point is provided. The method includes inputting at least one control error at a control error input of a windfarm control module, generating at least one manipulated variable depending on the at least one control error using at least one controller, and outputting the at least one manipulated variable at a manipulated variable output for transmission to the wind power installations. The method includes recording in each case at least one state of the windfarm, the windpower installations thereof and/or an ambient condition as farm state at a state input of the control module, and altering or predefining at
(Continued)

least one property of the at least one controller depending on the at least one recorded farm state by means of a controller setting device.

7 Claims, 6 Drawing Sheets

(52) U.S. Cl.
CPC ... *F05B 2220/7062* (2013.01); *F05B 2260/42* (2013.01); *F05B 2270/20* (2013.01); *F05B 2270/32* (2013.01); *F05B 2270/321* (2013.01); *F05B 2270/322* (2013.01); *F05B 2270/323* (2013.01); *F05B 2270/325* (2013.01); *F05B 2270/337* (2013.01); *F05B 2270/402* (2013.01); *Y02E 10/72* (2013.01)

(58) Field of Classification Search
CPC .......... F05B 2270/402; F05B 2270/325; F05B 2270/323; F05B 2270/322; F05B 2270/321; F05B 2270/32; F05B 2270/20; F05B 2260/42; F05B 2220/7062; F05B 2270/337
See application file for complete search history.

(56) References Cited

U.S. PATENT DOCUMENTS

| | | | |
|---|---|---|---|
| 8,121,738 B2 | 2/2012 | Teichmann et al. | |
| 8,649,911 B2 | 2/2014 | Avagliano et al. | |
| 8,874,276 B2 | 10/2014 | Garcia | |
| 9,366,227 B2 | 6/2016 | Garcia | |
| 9,997,922 B2 | 6/2018 | Beekmann et al. | |
| 10,063,060 B2 | 8/2018 | Beekmann et al. | |
| 10,174,742 B2 | 1/2019 | Diedrichs | |
| 2007/0183885 A1 | 8/2007 | Ormel et al. | |
| 2007/0228838 A1 | 10/2007 | Delmerico et al. | |
| 2008/0252076 A1* | 10/2008 | Fortmann | H02J 3/1885 290/44 |
| 2009/0160187 A1* | 6/2009 | Scholte-Wassink | F03D 9/10 290/55 |
| 2009/0309361 A1* | 12/2009 | Jurkat | F03D 9/257 290/44 |
| 2010/0117361 A1* | 5/2010 | Christensen | F03D 7/0224 290/44 |
| 2011/0006600 A1* | 1/2011 | Fontana | H02J 1/10 307/25 |
| 2012/0010755 A1 | 1/2012 | Stapelfeldt | |
| 2013/0168963 A1* | 7/2013 | Garcia | H02J 3/18 290/44 |
| 2013/0177388 A1* | 7/2013 | Ehrsam | F01D 19/00 415/1 |
| 2014/0021720 A1* | 1/2014 | Nelson | H02J 3/38 290/44 |
| 2014/0159367 A1* | 6/2014 | Yin | F03D 7/028 290/44 |
| 2015/0113174 A1* | 4/2015 | Yang | H04L 69/28 709/248 |
| 2015/0147174 A1* | 5/2015 | Couchman | B63B 13/00 416/1 |
| 2015/0249415 A1 | 9/2015 | Babazadeh et al. | |
| 2015/0252784 A1* | 9/2015 | Seymour | F03D 17/00 290/44 |
| 2015/0275862 A1* | 10/2015 | Babazadeh | H02J 3/46 290/44 |
| 2015/0345469 A1 | 12/2015 | Andresen et al. | |
| 2016/0069324 A1 | 3/2016 | Busker et al. | |
| 2016/0333854 A1* | 11/2016 | Lund | F03D 7/047 |
| 2017/0321655 A1* | 11/2017 | Møller | F03D 9/257 |
| 2018/0363627 A1* | 12/2018 | Nayebi | F03D 7/045 |
| 2019/0280640 A1* | 9/2019 | Ganireddy | H02S 10/12 |

FOREIGN PATENT DOCUMENTS

| | | |
|---|---|---|
| CN | 103915859 A | 7/2014 |
| CN | 104521090 A | 4/2015 |
| CN | 105191046 A | 12/2015 |
| DE | 102006014121 A1 | 12/2006 |
| DE | 102010007136 A1 | 8/2011 |
| DE | 102012221498 A1 | 5/2014 |
| DE | 102013207255 A1 | 10/2014 |
| DE | 102013207264 A1 | 10/2014 |
| DE | 10-2013-208410 A1 | 11/2014 |
| EP | 2654165 A1 | 10/2013 |
| EP | 2672114 A1 | 12/2013 |
| WO | 2009056156 A2 | 5/2009 |
| WO | 2009076968 A2 | 6/2009 |

\* cited by examiner

METHOD AND WINDFARM CONTROL STAGE FOR CONTROLLING A WINDFARM

BACKGROUND

Technical Field

The present invention relates to a method for controlling a windfarm having a plurality of wind power installations. Moreover, the present invention relates to a windfarm control module or stage for performing such a method. The invention furthermore relates to a windfarm that is controlled by such a method and/or by such a windfarm control module. Moreover, the present invention relates to a windfarm control device comprising a windfarm control module mentioned. The invention also relates to a wind power installation.

Description of the Related Art

Windfarms are known and they comprise a plurality of wind power installations that feed into an electrical supply network via a common network connection point. In this case, a windfarm can additionally comprise further apparatuses such as a battery store or other storage apparatuses for temporarily storing energy, and also so-called STATCOM installations, which can perform a static reactive power compensation.

Such a windfarm regularly not only serves to feed electrical power into the electrical supply network, but can also contribute to network support or at least improvement of the network quality. This includes, depending on network properties, that is to say properties of the electrical supply network, or the network behavior, that is to say the behavior of the electrical supply network, feeding in active power and/or reactive power or else reducing such an infeed in a targeted manner.

Such a network-dependent reactive power and/or active power infeed can be carried out by each wind power installation automatically according to predefined criteria. For effective utilization of a windfarm, it may also be advantageous for such an active and reactive power infeed of the windfarm to be centrally controlled by open-loop or closed-loop control. As a result, particularly the potency of a windfarm having many wind power installations can be utilized in a targeted manner by comparison with an individual wind power installation. In particular, it is possible as a result for the total output of the windfarm to be better controlled and thus for a certain continuity to be achieved.

Nevertheless, the wind power installations, for such closed-loop control, remain the actuators or form an actuator in their entirety. Downstream elements, in particular a network inductor of each wind power installation, a transformer of each wind power installation, connecting lines in the windfarm, possibly including overhead lines, capacitances occurring there or elsewhere, possibly further inductors in the farm and also a high-voltage transformer in the windfarm, can form the controlled system for which the wind power installations are the actuator. Voltage, fed active power and fed reactive power can form in each case a controlled variable or jointly a plurality of controlled variables at the network connection point.

The closed-loop control mentioned thus operates in principle such that a control module or stage, which can also be referred to as a farm controller, passes manipulated variables to the wind power installations and the latter, in the sense of a common actuator, output corresponding active and reactive power. Said active and reactive power is ultimately led to the network connection point via the controlled system mentioned. Fed active power, fed reactive power and network voltage measured at the network connection point can thus form feedback variables and be compared with corresponding setpoint values. One control error or a plurality of control errors can be formed therefrom and form the input of the controller or farm controller.

It should be taken into consideration that particularly the wind or the fluctuation of its properties affects the wind power installations as a disturbance variable within the meaning of control engineering. That concerns in particular a change in wind speed, wind direction and gustiness. The controlled system, too, is subjected to influencing variables or may change its transmission response. Mention should be made here of voltage changes, in particular, and also possible consumers that can be connected in, such as, e.g., battery stores which are charged. Variations in the transmission properties and the lines are also taken into account. These may be caused, e.g., by maintenance work, or by other switchovers in the internal farm network.

Such disturbance variables and also changes in the controlled system can regularly be corrected by a suitable controller. In particular, a so-called PI controller can react rapidly to changes by means of its P component and at the same time, by means of its I component, often produce steady-state accuracy even in the event of changes that occur.

It may also be more problematic if individual wind power installations do not operate normally. The situation in which a wind power installation fails is taken into account here, in particular. As a result, the actuator then changes because with one wind power installation less, for example, it can no longer implement the setpoint variable predefined by the control module, that is to say the farm controller, with the dynamic range taken as a basis. Other influencing variables are also taken into account, however; e.g., the fact that a wind power installation has to be operated in a reduced manner in part on account of a high temperature that has occurred, or that a restriction for complying with a sound level leads to a reduction. In this case, such a reduction can also mean that the wind power installation is presently reduced in terms of its power, and also that although it is not reduced in terms of its power, because it is already below such a reduction, it is upwardly limited in terms of its power output.

All such problems can then additionally influence the controlled dynamic range taken as a basis for the controller used. Such influencing can occasionally be significant.

The German Patent and Trademark Office searched the following prior art in the priority application in respect of the present application: DE 10 2006 014 121 A1, DE 10 2013 207 255 A1 and DE 10 2013 207 264 A1.

BRIEF SUMMARY

Changes in the wind power installations as actuator are taken into account in controlling the wind power installations.

The invention proposes a method for controlling a windfarm having a plurality of wind power installations. This takes as a basis a windfarm that feeds into an electrical supply network at a network connection point.

The method proceeds such that at least one control error is input at a control error input of a windfarm control module or stage. Such a windfarm control module has at least one controller and, in the simplest case, the control error is input at the input of the controller. It is also possible to input a plurality of control errors, namely one in each case in respect of different reference variables, wherein one control error in each case is then input at the input of a controller. A single-variable controller is taken as a basis here for simplification. However, consideration is also given to combining a plurality of controllers to form a multi-variable controller.

At least one manipulated variable is generated depending on the at least one control error. Here, too, in the simplest case, one manipulated variable is generated from one control error. If a plurality of control errors take effect, a plurality of manipulated variables can be generated as well. Preferably, a plurality of single-variable controllers are provided, which generate one manipulated variable in each case in respect of one control error. They can, however, also be combined in a multi-variable controller.

In particular, an active power to be fed by the windfarm and a reactive power to be fed by the windfarm are proposed as reference variables in respect of which a control error is determined.

Consequently, the at least one manipulated variable is generated depending on the at least one control error by means of at least one controller.

As a further method step it is proposed to record in each case at least one state of the windfarm, the wind power installations thereof and/or an ambient condition as farm state at a state input of the control module. This at least one farm state is thus input at the state input of the control module. Said farm state can thus concern a state of the windfarm, such as, e.g., what installations are present in the windfarm. The farm state can also concern a state of the wind power installations of the windfarm, in particular a respective state of a wind power installation, such as, e.g., the operating state thereof. That is correspondingly referred to as farm state of a wind power installation. The farm state can also concern an ambient condition, in particular a wind condition in the farm, in particular at a wind power installation of the windfarm. Such a farm state is referred to as farm state of an ambient condition.

It is proposed, then, to alter or to predefine at least one property of the at least one controller depending on the at least one recorded farm state. A controller setting device can be used for this purpose. Such a controller setting device can also be realized as a programmed module.

It is thus proposed to alter the farm controller depending on a farm state or actually to predefine said farm controller in the first place depending on said farm state. In this case, such farm states are not restricted to states within the meaning of traditional control engineering, but rather can also concern properties such as the number of wind power installations in the windfarm. The controller can be altered or predefined in terms of its parametrization or else in terms of its structure depending on one such farm state or a plurality of such farm states.

Predefining is taken into account particularly if the windfarm or the farm controller, which here can also be representative of a plurality of controllers, is put in operation.

Carrying out the process of altering or predefining at least one property of the at least one controller before a start-up or upon start-up affords the advantage that a start-up requires less individual adaptation and as a result, if appropriate, a start-up can be performed without a system developer. It may then be possible for a start-up to be carried out only by service personnel who regularly have to attend anyway to a start-up of a wind power installation and in particular of a windfarm.

Farm states, which will also be described in detail below, can thus be recorded upon the initial start-up in particular by means of a corresponding data interface and the corresponding controller or the corresponding controllers can be predefined depending on said farm states. For a structure predefinition, to that end provision can be made for selecting one of a plurality of predetermined controller structures depending on the one or the plurality of farm states. For a parameter selection, which can also be performed by means of a selection among a plurality of proposed controllers, the use of a calculation algorithm is preferably proposed, however. By way of example, for a PI controller, its time constant can be selected depending on the dynamic range of the actuator, or the controlled system. The assumption can be made here that the actuator is substantially formed from the totality of all the wind power installations.

If one wind power installation then fails, to mention a simple example, the actuator that is changed by this failure of the one wind power installation possibly requires more time to provide a power of the same magnitude. The time constant of the PI controller mentioned by way of example can be adapted to this changed dynamic range, that is to say, to put it simply, to this delayed dynamic range, and can be chosen to be correspondingly smaller, to mention just one example. The at least one controller is preferably altered such that the total transmission response of the control loop consisting of controller, actuator, system and measurement element as far as possible remains the same, and at least as far as possible has a similar dynamic range before and after the alteration.

It should thus be taken into consideration that an alteration of the transmission response of the actuator is taken into account in particular also by taking account of alterations of the wind power installations, including the failure thereof. Consequently, an alteration of the actuator can also be taken into account by the proposed method. That is also based on the insight that an alteration of the actuator must actually be taken as a basis in some cases.

Preferably, the number of wind power installations installed in the windfarm is recorded as farm state of the windfarm. Additionally or alternatively, it is proposed to record the rated active power of each wind power installation as farm state of the windfarm. Such a rated active power is a characteristic variable of the wind power installation. If it is present for each wind power installation of the windfarm, it thus also forms a characteristic variable of the windfarm. If there are only wind power installations of the same type in the windfarm, which often occurs, the total rated active power of the windfarm results from the number of wind power installations in the windfarm and the rated power of each wind power installation.

Additionally or alternatively, it is proposed to record the rated reactive power of each wind power installation as farm state of the windfarm. That, too, can thus be a characteristic variable for the windfarm. Particularly for issues of network support, the capability of each wind power installation and thus of the windfarm in respect of how much reactive power can be fed in is an important criterion. The rated reactive power is a characteristic value of the wind power installation, and the sum of all the rated powers in the farm is a characteristic variable of the windfarm, that can regularly also constitute an upper limit of the feedable reactive power.

Additionally or alternatively, the number and properties of STATCOM installations present in the windfarm are recorded as farm state of the windfarm. Such STATCOM installations can carry out a static reactive power compensation and can thus be of importance in particular in the case of a reactive power infeed by means of the wind power installations, in order to be able to assess a total reactive power proportion. They can make a contribution here and thus also be of relevance to the alteration or predefinition of a property of the controller.

Additionally or alternatively, it is proposed to record the number and properties of battery stores present in the windfarm as farm state of the windfarm. Properties of such battery stores are, in particular, the capacity thereof as characteristic variable and also the presently stored and available energy thereof. The dynamic range with which such battery stores can output or take up power may also be of importance for taking account of a control behavior.

Additionally or alternatively, it is proposed to record transmission properties of an internal farm network as farm state of the windfarm. These include properties such as the resistance and the reactance of transmission lines. A capacitive behavior is also taken into consideration. Such transmission properties are in this respect properties of the controlled system and they are advantageously used for altering or predefining at least one property of at least one controller.

Additionally or alternatively, it is proposed to record active and reactive power relationships of each wind power installation as farm state of the windfarm. Such active and reactive power relationships, which can regularly also be stored as a so-called PQ diagram, indicate a relationship between active power and reactive power that can be fed or generated by a wind power installation. In particular, often the maximum active power cannot be fed together with the maximum reactive power because the apparent power and thus the current to be fed could become too great in this case. On the other hand, it often happens that wind power installations, depending on type and equipment, cannot feed reactive power independently of the active power. In particular, it happens that reactive power cannot be fed without at least part of active power being fed as well. Such relationships can also play a part for altering or predefining a property of a controller in the windfarm and taking them into account is thus proposed as one embodiment.

In accordance with a further embodiment, it is proposed that the availability of each wind power installation with regard to the presently feedable active current is recorded as farm state of at least one wind power installation. To that end, each wind power installation can transmit such a value to the farm controller, in particular to the windfarm control module. The wind power installation thus firstly indicates whether it is actually available. If it is not available, its availability with regard to the presently settable active current should thus be quantified as 0. However, consideration is also given to the fact that the wind power installation is available, but can only feed part of its maximum active current, e.g., because not enough wind is present or because reduced operation is prescribed for sound reduction owing to the present time of day.

Additionally or alternatively, it is proposed to record the availability of each wind power installation with regard to its presently feedable reactive current as farm state of at least one wind power installation. Here the situation is similar to that for the presently feedable active current and reference is hereby made to the explanation in respect thereof. An additional factor, however, is that the feedable reactive current, depending on the individual case, can be more or less independent of wind speed. On the other hand, there may exist a dependence with respect to the active current, which can influence such an availability indication. These are also values which influence properties of the actuator formed from the wind power installations and are thus advantageously used for altering or predefining the controller property.

Additionally or alternatively, it is proposed to record a present operating state of each wind power installation as farm state of at least one wind power installation. Such operating states may be the presently fed power or the presently feedable power, the presently fed reactive power and the presently feedable reactive power. Purely as a precaution it is pointed out that power should be understood in principle to mean active power, and reactive power is expressly mentioned otherwise.

These operating states also influence the property of the actuator. Present limits of the actuator can be derivable in particular from the feedable power and feedable reactive power, which limits can in turn preferably be taken into account when altering or predefining the property of the controller.

In accordance with one embodiment, it is proposed that the present wind speed at at least one of the wind power installations is recorded as farm state of an ambient condition. The available potential particularly of active power can be inferred from this, too. In particular, also taking account of changes in wind speed permits conclusions to be drawn about the expected infeed capability of the windfarm.

Additionally or alternatively, it is proposed to record a present wind direction at at least one of the wind power installations as farm state of an ambient condition. In this case, the wind direction can influence the expected farm behavior, e.g., because in specific wind directions, depending on the type of windfarm, shutdowns can occur for some wind power installations, as a result of which the power generatable in total in the farm can decrease. That, too, is preferably taken into account when altering or predefining the controller.

Additionally or alternatively, it is proposed to record the present gustiness of the wind at at least one wind power installation as farm state of an ambient condition. Such gustiness can influence the uniformity of an active power and possibly also a reactive power output. Consideration is given, e.g., as one example, in the case of strong gustiness, to using rather a slower controller, that is to say either to selecting a correspondingly slower controller or to increasing a time constant of a controller. As a result, if appropriate, a certain smoothing can be achieved and a relieving of the load on the wind power installations and thus the actuator can thus be achieved. It is also taken into consideration and proposed as one embodiment to use a filter at the output of the farm controller depending on gustiness in order to filter the predefined values for active power and/or reactive power to be fed.

Additionally or alternatively, it is proposed to record the present air density of the wind at at least one of the wind power installations as farm state of an ambient condition. The air density of the wind can permit statements about the energy content of the wind, which can in turn influence the generatable active power. This, too, can thus advantageously influence the altering or predefining of the controller property.

Additionally or alternatively, it is proposed to record the present air humidity of the wind at at least one of the wind power installations as farm state of an ambient condition. This also influences the energy content of the wind. However, the air humidity of the wind can also give indications of whether, at correspondingly low temperatures, accretion of ice at wind power installations should be reckoned with.

This, too, can of course influence the controller and is preferably taken into account when altering or predefining at least one controller property.

Additionally or alternatively, it is proposed to record a present temperature of the wind at at least one of the wind power installations as farm state of an ambient condition. This can then cooperate with the recording of the air humidity of the wind as just described, in order to identify accretion of ice.

In accordance with one embodiment, it is proposed to predefine or to alter a parametrization of the at least one controller. In this case, a controller present, e.g., a PI controller or PID controller, can be used and be adapted only in terms of its parametrization. In particular, here a time constant can be adapted depending on the recorded farm state, or it can be predefined, particularly during the initial installation.

Additionally or alternatively, in accordance with one embodiment it is proposed to predefine or to alter a structure of the at least one controller. This is influenced by the insight that farm properties or alterations of farm properties can be taken into account not just by means of a suitable parametrization or adaptation of the parametrization, rather that an adapted structure can also be expedient. Particularly during initial installation, a suitable controller structure can thus be selected depending on the at least one recorded farm state. One possibility for implementation consists, in particular, in offering different controller structures for selection for different scenarios. For this purpose, e.g., a development engineer can compile a criteria catalog as to under which conditions which structures, that is to say which type of controller, ought to be chosen. By way of example, consideration is given to the fact that a windfarm having only a small number of wind power installations, e.g., up to 10 wind power installations, uses a PI controller for the active power control, whereas a PID controller should be used in the case of more wind power installations, to mention just one example. These two controllers mentioned by way of example, namely the PI controller and the PID controller, staying with this example, are in this case likewise provided by the development engineer. The start-up of the windfarm and thus also of the farm controller can then be carried out by service personnel without consulting the development engineer.

However, a change in the control structure of a windfarm that has already been put in operation is also taken into consideration. E.g., even the example mentioned above pertaining to start-up can occur during operation of the windfarm if the latter has, e.g., only a few more wind power installations than the 10 wind power installations mentioned by way of example. In this case, staying with the example, the PID controller would have to be used. If a number of wind power installations then fail such that fewer than 10 wind power installations are actually available, a change to the PI controller can be made here as well, particularly by means of a controller setting device.

In accordance with one embodiment, it is proposed that depending on a farm state of the windfarm a structure of the at least one controller is predefined or altered. It is thus proposed that for at least one farm state which concerns direct properties of the windfarm are used to predefine a structure of the controller, particularly upon initial start-up, or possibly to alter an existing structure. Such farm states can include the number of wind power installations in the windfarm, rated values of all the wind power installations, or the type and number of additional installations such as STATCOM installations or battery stores and also transmission properties of an internal farm network. It has been recognized here that such fundamental states of the windfarm can preferably be taken into account by means of a suitable structure.

Additionally or alternatively, it is proposed that depending on a farm state of the wind power installations a parametrization of the at least one controller is predefined or altered. These farm states thus concern particularly concrete and present properties of individual wind power installations, such as active current feedable thereby or reactive current feedable thereby, and also the issue of the present operating state of the wind power installation, as was explained above. It has been recognized here that for such farm states which concern properties of wind power installations present in the farm, advantageously only a parametrization of the at least one controller has to be adapted. This also takes account of the fact that such properties of the wind power installations may change more rapidly and more frequently than fundamental properties of the windfarm mentioned above. Consequently, in accordance with this embodiment, a structure alteration of the controller is avoided for such changes that are to be expected more rapidly and more frequently. Moreover, it is possible to carry out more rapid changes during the change of the parameters in steps of different magnitudes or at different speeds and an adaptation to the stated properties of the wind power installations is thus possible in a more targeted manner.

Additionally or alternatively, it is proposed that depending on a farm state of an ambient condition a parametrization and additionally or alternatively a structure of the at least one controller is predefined or altered. It has been recognized here that ambient conditions that influence the farm can be taken into account by means of a parametrization and also structure selection of the controller. Particularly for variations in wind speed, it is proposed only to alter a parametrization, which if appropriate is also trackable more rapidly and in smaller steps. In the case of accretion of ice, by contrast, an alteration of the control structure is proposed. In this case it has been recognized, in particular, that such accretion of ice makes it expedient for account to be taken by means of a structurally changed controller, and that moreover the situation of accretion of ice normally occurs only infrequently and is not subject to a rapid change, as is the case for an alteration of wind speed.

Preferably, it is thus proposed that for predefining or altering a controller structure, a choice is made between stored controller structures.

In accordance with a further embodiment, it is proposed that a deviation between setpoint and actual values of a network voltage at the network connection point is processed as control error. Here the network voltage at the network connection point thus forms the reference variable for the controller or for one of the controllers.

Additionally or alternatively, a deviation between setpoint and actual values of the active power fed at the network connection point is processed as control error. Here the fed active power at the network connection point thus forms the reference variable for the controller or for one of the controllers. The active power fed by the windfarm can thus be controlled accordingly. In this case, the wind power installations function as an actuator and the controller can thus act on the wind power installations as actuator depending on the fed active power then actually established at the network connection point.

Additionally or alternatively, it is proposed that a deviation between setpoint and actual values of the reactive power fed at the network connection point is processed as control error. In this case, the reactive power forms the reference variable of the controller or a reference variable of one of the controllers. The reactive power can thus be controlled accordingly in a manner very similar to that described with regard to the active power. Preferably, all three reference variables mentioned are used. Particularly preferably, two controllers are used, of which one controller uses the fed active power as reference variable and the other controller uses the fed reactive power as reference variable.

The invention also proposes a windfarm control module for controlling a windfarm having a plurality of wind power installations and feeding into an electrical supply network at a network connection point. This proposed windfarm control module comprises a control error input, at which at least one control error (e) is input, a manipulated variable output, at which at least one manipulated variable (u) is output for transmission to the wind power installations, at least one controller for generating the at least one manipulated variable depending on the at least one control error, a state input for recording in each case at least one state of the windfarm, the wind power installations thereof and/or an ambient condition as farm state, and a controller setting device for altering or predefining at least one property of the at least one controller depending on the at least one recorded farm state.

Via the control error input, a control error can be input, that is to say a deviation between setpoint and actual values of a reference variable, in particular a reference variable already described above. It is also possible for a plurality of control error inputs to be provided or for a plurality of different control errors to be input at the control error input.

The proposed manipulated variable output is provided for outputting at least one manipulated variable for transmission to the wind power installations. The windfarm control module can thus perform closed-loop control and pass generated manipulated variables to the wind power installations in order to use the latter as actuators.

Additionally, the proposed windfarm control module has at least one controller for generating such a manipulated variable depending on the at least one control error. Said controller, a plurality of which can also be provided, thus includes the actual control specification. Preferably, a plurality of controllers are provided, such as, e.g., a controller for controlling an active power to be fed and a controller for controlling a reactive power to be fed.

The proposed windfarm control module also has a state input for recording in each case at least one state of the windfarm, the wind power installations thereof and/or an ambient condition. These states are referred to as farm states and, for explanation purposes, reference is made to the above-described embodiments of the method described which explain the individual farm states.

Additionally, it is proposed that the windfarm control module has a controller setting device, which can alter or predefine at least one property of the at least one controller. This altering or predefining is intended to be carried out depending on the at least one recorded farm state. The control setting device is thus configured to carry out altering or predefining of at least one property of the at least one controller in the manner as explained in accordance with at least one above-described embodiment of the method.

Preferably, the proposed windfarm control module is configured to carry out a method according to one of the above-described embodiments of a method. In particular, to that end a process computer can be provided in the windfarm control module, on which such a method is implemented.

The invention also proposes a windfarm control device, configured to controlling a windfarm having a plurality of wind power installations and feeding into an electrical supply network at a network connection point. Such a windfarm control device comprises at least one measurement input for recording at least one measurement signal, a setpoint value device for predefining at least one setpoint value, a windfarm control module for generating at least one manipulated value for the wind power installations, and a state input for recording the state of the windfarm, the wind power installations thereof and/or an ambient condition as farm state. Furthermore, this windfarm control device has a controller setting device for altering or predefining at least one property of the windfarm control module.

In this case, such a measurement input can be connected to a measurement sensor or to a unit that has already evaluated a measurement signal. In this case, consideration is also given to obtaining measurement signals, e.g., of wind speeds or wind directions, from a wind power installation.

The setpoint value device for predefining at least one setpoint value can in particular for its part receive at least one setpoint value. It can receive such a setpoint value, e.g., using of a SCADA system and additionally or alternatively from an operator of the electrical supply network. In this case, the setpoint value device can also serve for management or selection between such setpoint values. It can also obtain setpoint values from other inputs and in particular select between various setpoint values. Consideration is also given to the setpoint value device modifying one setpoint value or a plurality of setpoint values, particularly if the latter cannot be realized, e.g., owing to weak wind and should therefore be reduced, to mention just one example.

The proposed windfarm control module can operate as explained above and generate at least one manipulated value for the wind power installations. A state input is provided for recording at least one farm state. Said state input can also be part of the windfarm control module.

Finally, a controller setting device is provided, which alters at least one property of the windfarm control module depending on at least one recorded farm state. Consideration is given here, in particular, to altering or predefining properties of the controller implemented in the windfarm control module, or of a single controller of this type.

Preferably, the windfarm control module of the windfarm control device is designed in the manner as described in accordance with at least one above-described embodiment of a windfarm control module.

The invention also proposes a windfarm having a plurality of wind power installations feeding into an electrical supply network at a network connection point. Said windfarm additionally comprises a windfarm control module in accordance with at least one embodiment described above, or it comprises a windfarm control device in accordance with one embodiment described above. In principle, it can also comprise both, in which case the windfarm control module can then be part of the windfarm control device.

The invention additionally proposes a wind power installation and such a wind power installation comprises an aerodynamic rotor, coupled to a generator for generating electrical power from wind, an inverter unit having a current output for generating electric current and for outputting at the current output for feeding into an electrical supply network, a connection for electrically connecting the inverter unit to an internal farm network of a windfarm in order to feed the generated electric current into the electrical supply network at a network connection point via the farm network, and a communication interface for communicating with a windfarm control module or a windfarm control device in order to receive and implement manipulated variables from the windfarm control module or the windfarm control device, wherein the wind power installation is furthermore configured to transmit states of the wind power installation via the communication device to the windfarm control module or the windfarm control device in order to enable the windfarm control module or the windfarm control device to alter at least one property of a controller of the windfarm control module or of the windfarm control device depending on the transmitted states.

By means of the aerodynamic rotor, the generator is thus driven via wind, which generator generates electrical power or converts mechanical power into electrical power. The inverter unit generates electric current from said electrical power, which can be provided, e.g., as DC current with a DC voltage, said electric current being configured, in particular, according to frequency, phase angle and the associated voltage amplitude for feeding into the electrical supply network. However, it can firstly be output at a current output of the inverter.

Via a connection, which can be designed, e.g., as a current terminal, said inverter unit is connected to an internal farm network of the windfarm. Network inductors and a transformer can also be involved therein. The electric current is then fed into the electrical supply network at a network connection point via the farm network, namely together with further superposed currents of other wind power installations or of other inverter units of other wind power installations in the windfarm.

The communication interface is provided for communication with a windfarm control module or a windfarm control device. Communication with a farm controller is thus provided. This way, it is possible to receive manipulated variables or at least one manipulated variable from the farm controller, e.g., an active current or a reactive current, which is then correspondingly implemented, that is to say generated, by the wind power installation, in particular also the inverter unit.

The wind power installation is furthermore configured to transmit its states or a portion of its states via the communication device to the farm controller, that is to say the windfarm control module or the windfarm control device. In a manner dependent thereon, the farm controller can alter at least one property of an implemented controller depending on said transmitted states. In this respect, this is made possible or implemented here by the performance of a method in accordance with at least one of the above-described embodiments concerning the method. In particular, the wind power installation is configured to communicate with a windfarm control module in accordance with one of the embodiments described above in this regard, and additionally or alternatively to communicate with a windfarm control device in accordance with an embodiment described above in this regard. Additionally or alternatively, the wind power installation is configured to be operated in a windfarm described above in accordance with one embodiment.

BRIEF DESCRIPTION OF THE SEVERAL VIEWS OF THE DRAWINGS

The invention will now be explained in greater detail by way of example below on the basis of exemplary embodiments with reference to the accompanying figures.

DETAILED DESCRIPTION

Figure 1:
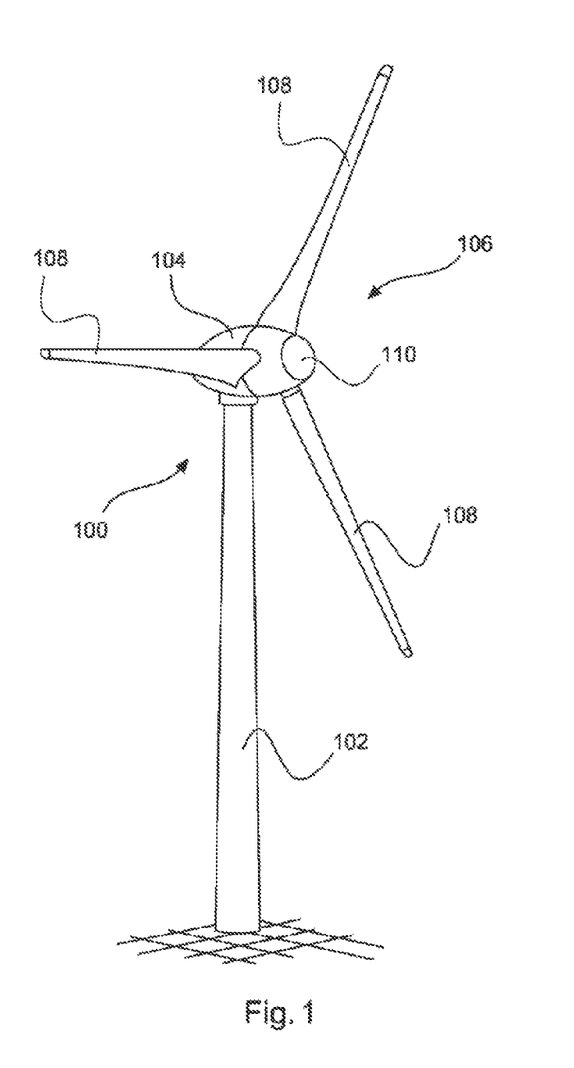
FIG. 1 shows a wind power installation in a perspective illustration.

FIG. 1 shows a wind power installation 100 comprising a tower 102 and a nacelle 104. A rotor 106 having three rotor blades 108 and a spinner 110 is arranged on the nacelle 104. The rotor 106 is set in rotation motion by the wind during operation and drives a generator in the nacelle 104 as a result.

Figure 2:
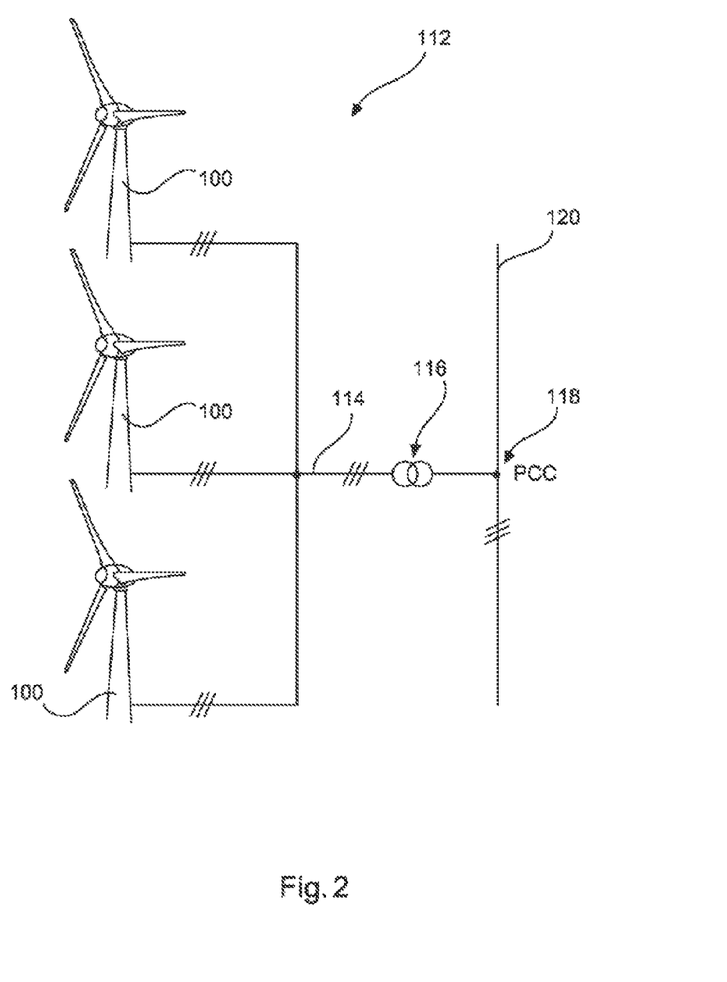
FIG. 2 shows a windfarm in a schematic illustration.

FIG. 2 shows a windfarm 112 comprising for example three wind power installations 100, which can be identical or different. The three wind power installations 100 are thus representative of basically an arbitrary number of wind power installations of a windfarm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a windfarm 112, which for example does not show a controller, even though a controller is present, of course. Moreover, by way of example, the farm network 114 can be configured differently, with for example a transformer also being present at the output of each wind power installation 100, to mention just one different exemplary embodiment.

Figure 3:
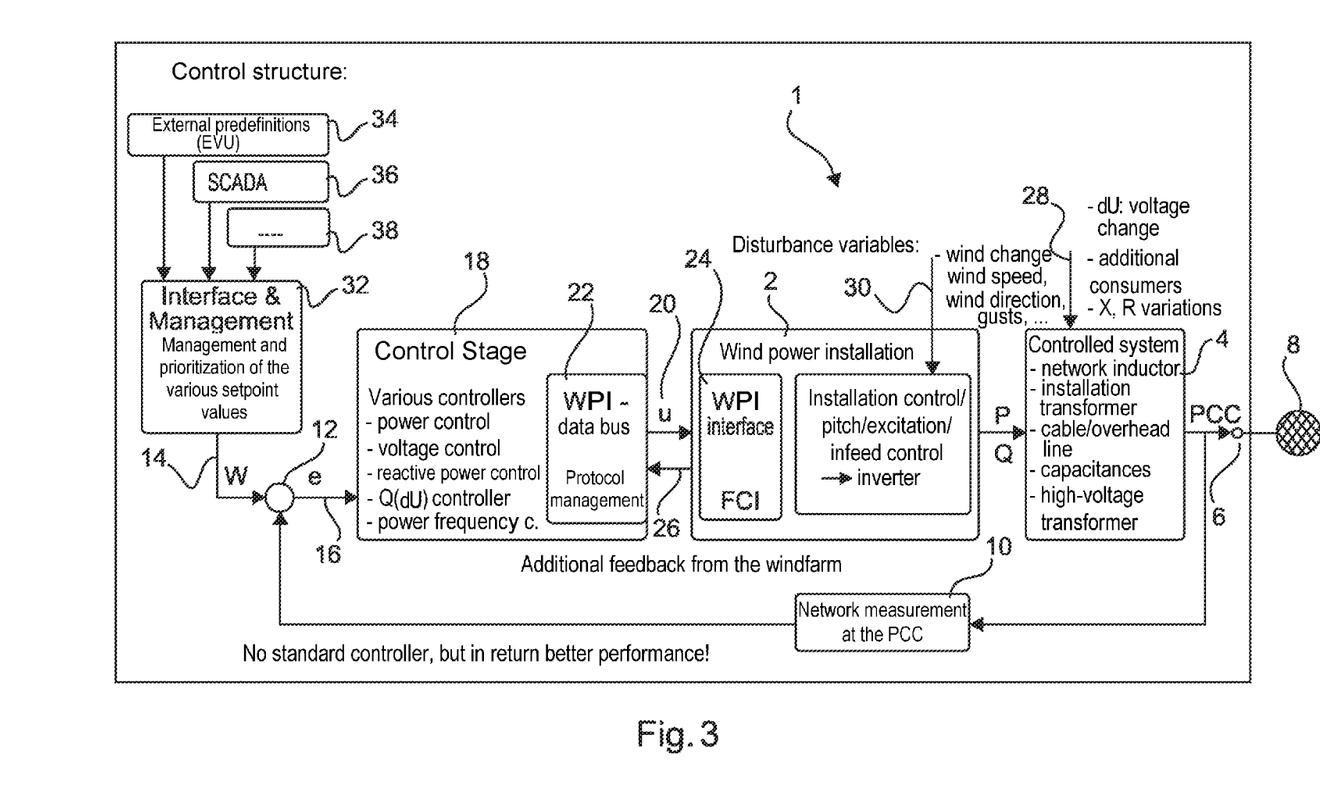
FIG. 3 shows a control structure in accordance with one embodiment.

FIG. 3 illustrates in the control structure a proposed control set-up of a windfarm 1. The windfarm 1 is substantially formed by the wind power installations 2 and an internal farm network 4, which can also comprise network inductors and transformers besides transmission runs. Ultimately, however, the elements of the control structure that are also explained below can also be regarded as part of the windfarm 1. Finally, the farm controller is also part of the windfarm 1.

In any case provision is made for feeding active and reactive power at the network connection point 6 into an electrical supply network 8, which can also be referred to as network for simplification.

Measurement values at said network connection point 6, in particular a voltage U, fed active power P and fed reactive power Q, can be detected by a measurement device 10. They can be fed to a comparison location 12, at which a setpoint-actual value comparison with a reference variable 14 input there, which is usually also designated by a w, is conducted. The result is the control error 16, which is usually also designated by an e. The reference variable 14 and correspondingly the control error 16 are illustrated here by way of example as one variable, but they can also each concern a plurality of variables; by way of example, two reference variables can be provided, namely one for an active power P to be fed and one for a reactive power Q to be fed.

The control error 16 is input into a control module or stage 18 comprising at least one controller. For the example of the two reference variables, namely active power P and reactive power Q, two controllers can be contained here. Said controller or said controllers then obtain (in each case) the corresponding control error as input variable and output in each case a manipulated variable 20, which can also be designated by the letter u. For outputting purposes, the control module 18 has an output module or stage 22, which can be configured as a wind power installation data bus and can communicate with a communication module or stage 24. Such a communication module 24 can be present at each wind power installation of the wind power installations 2. Said communication module can also be referred to as wind power installation interface.

It is proposed, then, that the control module 18, which can also be referred to as windfarm control module, obtains at least one farm state from the wind power installations 2. This is depicted in FIG. 3 as farm signal 26, using which at least one farm state is passed back to the control module 18. Said farm signal 26 with at least one farm state is passed back here from the wind power installations 2, in particular from at least one communication module 24, to the output module 22 of the control module 18. In this respect, the output module 22 forms a state input of the control module 18. Consequently, the communication module 24 cannot only operate for the purpose of recording the manipulated variable 20, but also output data in the other direction. Likewise, the output module 22 not only outputs the manipulated variable or a plurality of manipulated variables 20, but can also receive and process further one or a plurality of farm states.

The further processing of the at least one farm state is then carried out such that at least one controller contained in the control module 18 is altered in terms of its parametrization and additionally or alternatively in terms of its structure. This alteration can be performed by the output module 22 or a different part of the control module 18.

The at least one farm state that is passed back using the farm signal 26 can firstly be a state of the wind power installations 2 which contain said communication module 24 in accordance with FIG. 3. However, consideration is also given to the wind power installations recording ambient conditions and transmitting them to the control module 18 via said farm signal 26, or in some other way.

In this case, the transmission of the farm signal 26 is also representative of the inputting of other variables that do not originate directly from the wind power installations 2. They may include, for example, whether and how many STATCOM installations are present in the windfarm. In this respect, said communication module 24 is also representative of many communication modules. In particular, each wind power installation 2 can have a dedicated communication module 24. In this sense other elements in the windfarm, such as the STATCOM installation mentioned or else a battery store, can also have such a communication module.

Moreover, the output module 22, which obtains said farm signal or many farm signals 26, can itself perform a first evaluation. By way of example, consideration is given to all elements in the farm, that is to say in particular all wind power installations and also the other additional apparatuses such as STATCOM installation or battery stores, transmitting content-related information about the representatively illustrated farm signal 26 to the control module 18. From the fact that these installations transmit such information, the output module 22 can also recognize how many and which elements, that is to say which apparatuses, transmit such data. Accordingly, the output module 22 can thereby also determine the number of relevant apparatuses, elements or installations in the farm and correspondingly process further or pass on the latter within the control module 18.

In this respect, consideration is also given to the controlled system 4, which concerns in particular properties of the internal farm network, likewise transferring information in the sense of the farm signal 26 to the control module. To that end, provision can be made of measurement units in or at the internal farm network, for example, which measurement units can have a communication module 24.

The controlled system 4 is subject in particular to voltage changes, changes in connected consumers and variations of the impedance Z thereof, in particular the imaginary portion X thereof and the real portion R thereof. Such information can be passed back to the control module 18 as farm state via the farm signal. The influence of these variables is identified as disturbance influence 28 as influence arrow into the controlled system 4.

Disturbance variables 30 that act on the wind power installations 2 are likewise identified by means of such an influence arrow. The proposed adaptation of the at least one controller in the control module 18 by means of the feedback of at least one farm state via the farm signal 26 thus also makes it possible to take account of such disturbance influences 30 affecting the wind power installations and also disturbance influences 28 affecting the controlled system. The disturbance variables 30 affecting the wind power installations are primarily the wind, in particular changes in wind speed, wind direction, or the varying occurrence of gusts.

Furthermore, the control structure in FIG. 3 has a setpoint value device 32. Said setpoint value device can predefine the reference variable 14. To that end, it can evaluate various predefinitions input externally, select therefrom and/or carry out a prioritization. To that end, external predefinitions 34 can be predefined in particular by an operator of the electrical supply network 8 and be correspondingly input into the setpoint value device 32. However, consideration is also given to an inputting, in particular by means of service personnel, via a SCADA system 36. Further possibilities of an external inputting are also conceivable, which are indicated here by the block 38.

Consequently, the control of the control module 18, in particular of the controllers contained therein, for the control of the active power P and the reactive power Q, can firstly be initialized or put into operation in a simple manner and thus also in a reliable manner. Only the signals that are input into the output module 22 as farm signal 26 need be evaluated for this purpose. Furthermore, in this manner the control can also be adapted to changing conditions in the farm.

Figure 4:
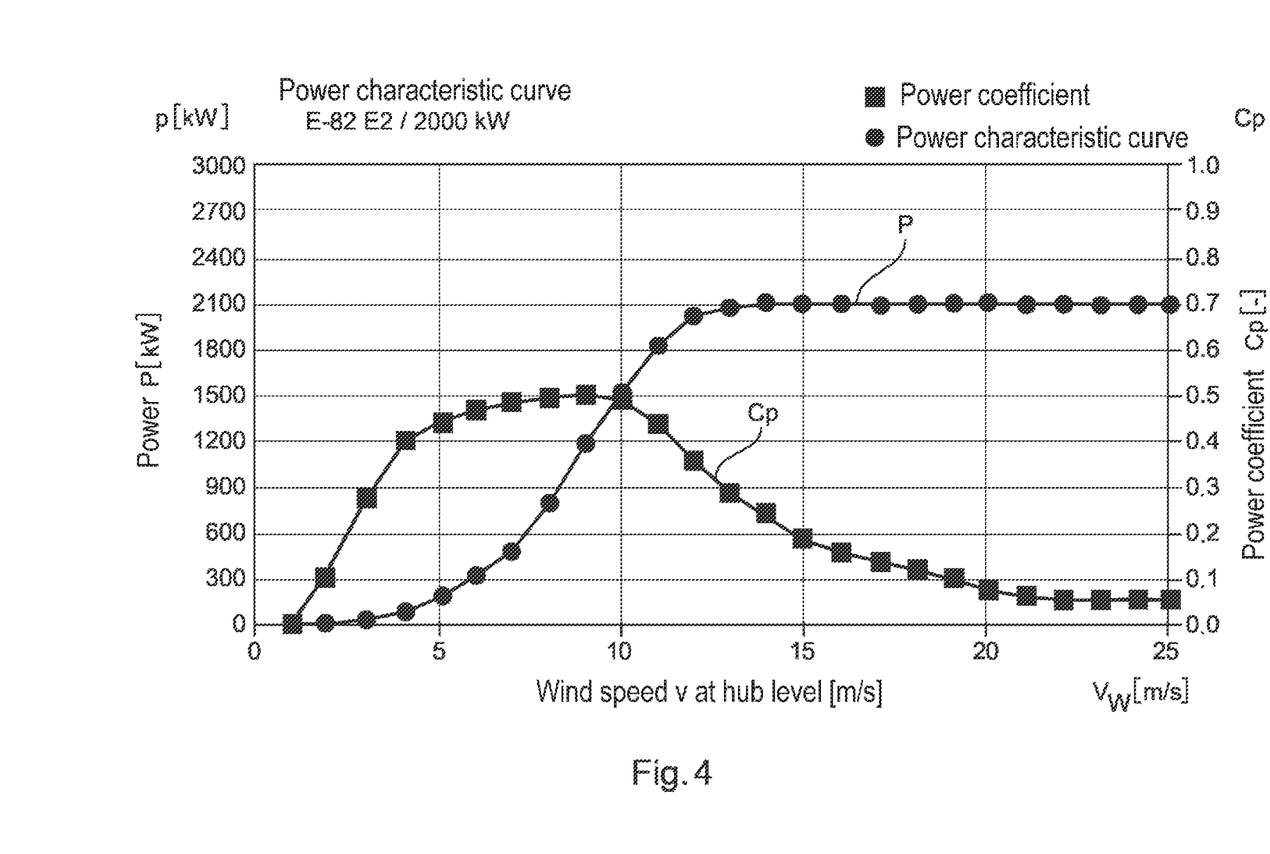
FIG. 4 shows a diagram of a power characteristic, for illustrating the invention.

FIG. 4 shows a diagram of a power characteristic curve P for further illustration of the invention. Here the power P and also a power coefficient $C_P$ are plotted against the wind speed $V_W$. FIG. 4 can in particular clarify that a different amount of power can be generated depending on the prevailing wind speed $V_W$. However, that also means that the relevant wind power installation can react to changes dynamically in varying ways.

Consequently, a further aspect of the underlying invention consists in improving an active power controller for a windfarm in as much as a static controller is replaced by an adaptive controller. Said adaptive controller recognizes different operating points of the windfarm or of other components in the windfarm and adapts to the circumstances. In this case, it can maintain its structure and adapt it by means of parameters, or the type of controller or the control structure is even altered depending on the operating point, for example from a PID controller to a PI controller. Consideration is also given to connecting in an additional filter for a controller deviation.

One consideration here is that a power output or the dynamic range of a power provision of the wind power installation is dependent on the wind. On the basis of the power curve P in FIG. 4 it can be discerned that the maximum power of the wind power installation is dependent on the wind speed.

From said curve it is possible to comprehend the exemplary consideration that for the case where the intention is to achieve an operating point at P=1200 kW, this can be carried out more rapidly if a wind speed of 15 m/s prevails than if only a wind speed of 9 m/s were available at the wind power installation. This is essentially a matter of accelerating the aerodynamic rotor to the required rotational speed as rapidly as possible. This occurs more rapidly if the wind speed at the installation is greater than necessary.

If the wind situation within the windfarm is sufficiently known, this information can concomitantly influence the controller and thus lead to a better control behavior. In the same way, other aspects such as gusty winds can also be recognized and the controller can concomitantly process this information. This is based on the insight that at such an operating point of operating the power control of the wind power installation itself causes relatively high power fluctuations, namely owing to the internal controllers, in particular rotational speed, power and pitch control. This would not occur, or would occur to a lesser extent, in the event of a comparatively constant wind prevailing, for example. In accordance with one proposal, for this purpose it is proposed to smooth the output variable of the windfarm controller in order that additional stimuli from the windfarm controller do not also affect the power control of the wind power installation. In this respect, it is thus possible to provide a realization by means of a filter as supplementary element. In this respect, such a filter can constitute a supplementation or alteration of the controller.

Figure 5:
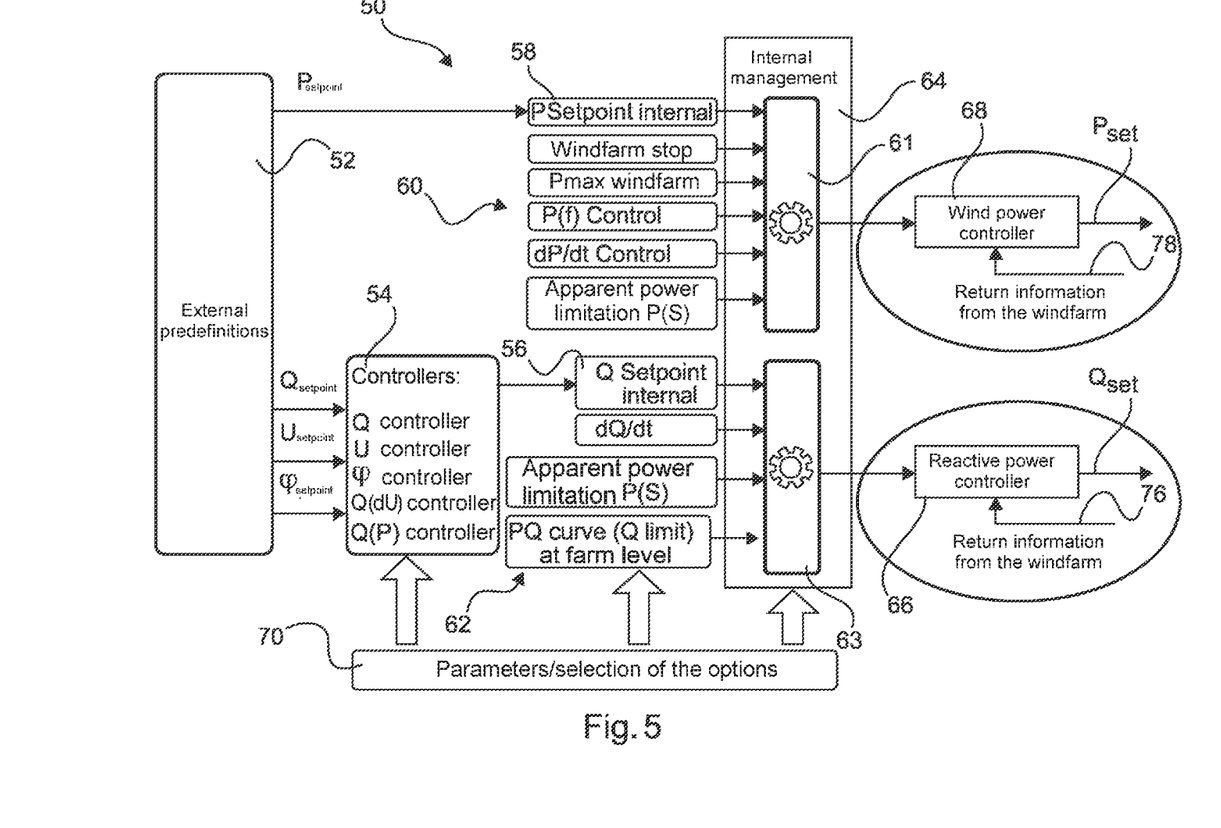
FIG. 5 shows a control structure in accordance with a further embodiment.

FIG. 5 shows a control structure in accordance with a further embodiment. In this control structure 50, firstly external predefinitions are predefined, in particular the setpoint values for active power $P_{setpoint}$, reactive power $Q_{setpoint}$, the voltage level $U_{setpoint}$ and the phase angle $Phi_{setpoint}$ (or $\phi_{setpoint}$). The last four variables, in particular, can be incorporated in a reactive power preliminary controller 54, which can comprise a Q controller, U controller, Phi controller (or ϕ controller), Q(dU) controller and a Q(P) controller.

The result of said reactive power preliminary controller 54 can then be input into a reactive power operating point controller 56. The active power setpoint value $P_{setpoint}$ can likewise directly influence a reactive power operating point controller 58 in a similar way. What is thus achieved is that the active power $P_{setpoint}$ provided and also the reactive power $Q_{setpoint}$ provided are not switched directly as setpoint value to the active power controller 68 and reactive power controller 66, respectively. In a manner similar to the reactive power operating point controller 56 and active power operating point controller 58, various other auxiliary controllers 60 are also provided, which concern various other variables. These include possible stopping of the windfarm (windfarm stop), taking into account a maximum active power ($P_{max}$ windfarm), a frequency-dependent power control (P(f) control), a control of the power change (dP/dt control) and an apparent power limitation (apparent power limitation P(S)). These auxiliary controllers 60 ultimately concern the active power control. They act on an active power block 61, which is part of a management block 64. Said active power block 61 then inputs an active power setpoint value into the actual active power controller 68. In this respect, said active power controller 68 is a controller which would be arranged in the control module 18 in accordance with the structure in FIG. 3. The active power controller 68 can thus be part of a windfarm control module 18. Said active power controller 68 then outputs an active power operating point $P_{set}$ to the wind power installations.

In a structurally similar manner, auxiliary controllers 62 are also provided for the reactive power predefinition, said auxiliary controllers concerning a reactive power change with respect to time (dQ/dt), also an apparent power limitation (apparent power limitation P(S)), and a limitation of a PQ curve at the farm level (PQ curve (Q limit) at farm level). These auxiliary controllers 62 together with the reactive power operating point controller 56 act on the reactive power block 63, which is likewise part of the management block 64. The reactive power block 63 then passes a setpoint value directly to the reactive power controller 66. The reactive power controller 66 outputs a reactive power operating point $Q_{set}$ to the wind power installations.

For the purpose of improvement it is then proposed to pass information back from the windfarm as farm states 76 and 78 to the reactive power controller 66 and active power controller 68, respectively. Said farm states 76 and 78 can also be identical. In any case it is then proposed here that the active power controller 68 is dependent on the farm states 78 and can change in terms of its parametrization and/or structure in a manner dependent thereon. In the same way it is proposed that the reactive power controller 66 can change depending on the farm states 76. For said reactive power controller, too, consideration is given to a change in terms of the parametrization and also the structure. As a result, it is possible to achieve a good adaptation of these two controllers to the situation in the farm and in particular also to changes of situations in the farm.

Furthermore, a parametrization module or stage 70 is proposed, which likewise obtains farm states, this not being depicted here. On the basis of such farm states, the parametrization module 70 can independently perform a parametrization, if appropriate also structuring or selection of options, for the reactive power preliminary controller and also for the reactive power operating point controller 56, active power operating point controller 58 and the auxiliary controllers 60 and 62. It is additionally possible to provide a parametrization, structure change or option selection for the management block 64. Consequently, what can be achieved here, too, is that the implementation of controller structures in particular upon the start-up of the farm or of the farm computer can be performed automatically or largely automatically by said parametrization module 70. That not only facilitates the start-up, but also avoids errors.

Figure 6:
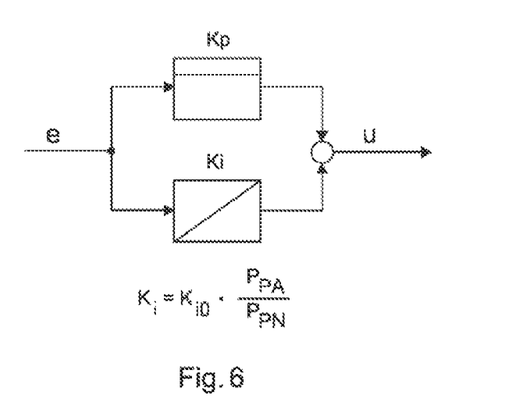
FIG. 6 shows by way of example a PI controller in a structure diagram for illustrating parametrization.

FIG. 6 illustrates a structure of a PI controller. Here a PI controller is shown basically in a known way, which PI controller can be described by a proportionality constant $K_P$ and an integration constant $K_I$. Its input is generally formed by the error e and it outputs the manipulated variable u as output variable. Such parameters can be adapted for the purpose of parametrization. By way of example, which should be understood merely as an exemplary example, the integration constant $K_I$ can be calculated as a product of a nominal constant or basic constant $K_{I0}$ and the quotient of available rated power of the windfarm $P_{PA}$ divided by the rated power of the windfarm $P_{PN}$.

Figure 7:
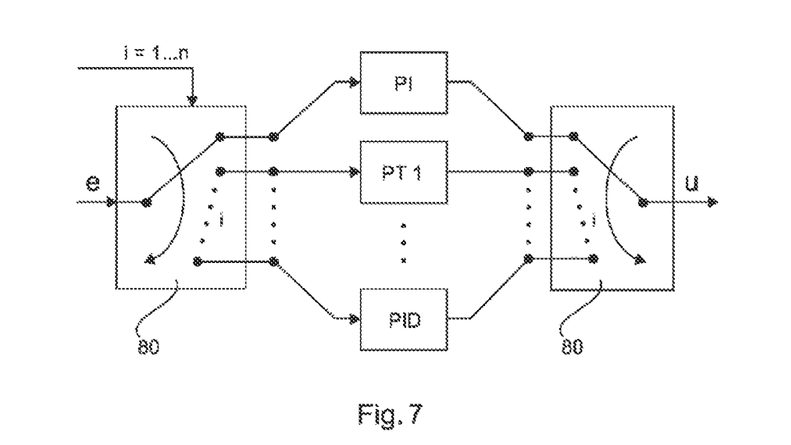
FIG. 7 shows an exemplary structure diagram in accordance with one embodiment for selecting a control structure.

In this respect, FIG. 6 shows one example of a parameter alteration, and FIG. 7 shows one example of a structure alteration, namely how this can be implemented. This structure in FIG. 7 is also illustrated as a simplification for explanation purposes. FIG. 7 is also based on a controller which obtains a control error e as input and outputs a manipulated variable u. As the actual controller here three exemplary blocks are provided, namely a PI controller, which is designated as PI for simplification, a PT1 controller, which is designated as PT1 for simplification, and a PID controller, which is designated as PID for simplification.

Only one of these three controllers PI, PT1 and PID is active in each case. To that end, the switchover apparatus 80, which has two individual synchronized partial switching blocks, can carry out a switchover between these three exemplary controllers and further controllers. By way of example, these can be switched depending on the number of available wind power installations in the windfarm. For this purpose, by way of example, this value of the number of available wind power installations is identified by the variable i. This variable i can assume values from 1 to n, wherein n corresponds to the maximum number of wind power installations in the farm. Theoretically, i could also assume a value 0, except in that case no wind power installation in the farm would be active and any controller selection would then be pointless.

In any case it is assumed here that the number of available wind power installations i can range from 1 to n, and it is proposed here that the switchover apparatus 80 switches over between these controllers depending on this number of available wind power installations i. Such a switchover can also be carried out in a process computer, of course. Consequently, it is thus also possible to select or to alter different controller structures, depending on states of the windfarm, illustrated on the basis of the example of the number of available wind power installations in FIG. 7. The realization is effected in such a way that such different controllers are stored for selection.

The invention claimed is:

1. A method for controlling a windfarm having a plurality of wind power installations and feeding into an electrical supply network at a network connection point, the method comprising:

inputting at least one control error at a control error input of a windfarm control stage, generating, by at least one controller of the windfarm control stage, at least one manipulated variable based on the at least one control error, outputting the at least one manipulated variable at a manipulated variable output for transmission to the plurality of wind power installations, receiving, at a state input of the windfarm control stage, one or more park signals including a farm state, wherein the one or more park signals are data signals, and are received from the plurality of wind power installations, wherein the one or more park signals include information on changes in the plurality of wind power installations functioning as actuators, and wherein the farm state is recorded in at least one of the plurality of wind power installations, the farm state being indicative of a state of at least one of:

a number of wind power installations installed in the windfarm;

a rated active power of each wind power installation;

a rated reactive power of each wind power installation;

a number and properties of STATCOM installations present in the windfarm;

a number and properties of battery stores present in the windfarm;

transmission properties of an internal farm network;

active and reactive power relations of each wind power installation;

an availability of each wind power installation;

an operating state of each wind power installation;

an ambient wind speed at one or more of the wind power installations;

an ambient wind direction at one or more of the wind power installations;

an ambient gustiness of wind at one or more of the wind power installations;

an ambient air density of the wind at one or more of the wind power installations;

an ambient air humidity of the wind at one or more of the wind power installations; and an ambient temperature of the wind at one or more of the wind power installations, altering, by a controller setting device, at least one controller parametrization or controller structure of the at least one controller based on the farm state in response to the changes in the plurality of wind power installations functioning as the actuators, and altering the at least one controller parametrization or controller structure of the at least one controller before a start-up or during operation of the windfarm or a wind power installation of the plurality of wind power installations, wherein the information on changes in the plurality of wind power installations functioning as actuators in the one or more park signals includes:

a present availability of active current for feeding-in for each wind power installation of the plurality of wind power installations, a present availability of reactive current for feeding-in for each wind power installation of the plurality of wind power installations, and a present operating state of each wind power installation of the plurality of wind power installations, the present operating state including:

presently feedable active power, and presently feedable reactive power.

2. A method for controlling a windfarm having a plurality of wind power installations and feeding into an electrical supply network at a network connection point, the method comprising:

inputting at least one control error at a control error input of a windfarm control stage, generating, by at least one controller of the windfarm control stage, at least one manipulated variable based on the at least one control error, outputting the at least one manipulated variable at a manipulated variable output for transmission to the plurality of wind power installations, receiving, at a state input of the windfarm control stage, one or more park signals including a farm state, wherein the one or more park signals are data signals, and are received from the plurality of wind power installations, wherein the one or more park signals include information on changes in the plurality of wind power installations functioning as actuators, and wherein the farm state is recorded in at least one of the plurality of wind power installations, the farm state being indicative of a state of at least one of:

a number of wind power installations installed in the windfarm;

a rated active power of each wind power installation;
a rated reactive power of each wind power installation;
a number and properties of STATCOM installations present in the windfarm;
a number and properties of battery stores present in the windfarm;
transmission properties of an internal farm network;
active and reactive power relations of each wind power installation;
an availability of each wind power installation;
an operating state of each wind power installation;
an ambient wind speed at one or more of the wind power installations;
an ambient wind direction at one or more of the wind power installations;
an ambient gustiness of wind at one or more of the wind power installations;
an ambient air density of the wind at one or more of the wind power installations;
an ambient air humidity of the wind at one or more of the wind power installations; and
an ambient temperature of the wind at one or more of the wind power installations, altering, by a controller setting device, at least one controller parametrization or controller structure of the at least one controller based on the farm state in response to the changes in the plurality of wind power installations functioning as the actuators, and
altering the at least one controller parametrization or controller structure of the at least one controller before a start-up or during operation of the windfarm or a wind power installation of the plurality of wind power installations,
wherein the one or more park signals includes:
a number of wind power installations installed in the windfarm,
rated active power of each wind power installation of the plurality of wind power installations,
rated reactive power of each wind power installation of the plurality of wind power installations,
number and properties of STATCOM installations in the windfarm,
number and properties of battery stores in the windfarm,
transmission properties of an internal farm network, and
active and reactive power relationships or P-Q diagram of each wind power installation of the plurality of wind power installations.

3. The method as claimed in claim 1, wherein the one or more park signals includes a state from a list of states including:
a present wind speed of at least one of the plurality of wind power installations,
a present wind direction of at least one of the plurality of wind power installations,
a present gustiness of wind of at least one of the plurality of wind power installations,
a present air density of the wind of at least one of the plurality of wind power installations,
a present air humidity of the wind of at least one of the plurality of wind power installations, and
a present temperature of the wind of at least one of the plurality of wind power installations.

4. The method as claimed in claim 1, comprising:
selecting between stored controller structures; and
altering or predefining the controller structure of the at least one controller based on the selected controller structure.

5. The method as claimed in claim 1, comprising:
determining the at least one control error as a deviation between setpoint and actual values of at least one of reference variables:
network voltage at the network connection point,
active power fed at the network connection point, or
reactive power fed at the network connection point.

6. A windfarm control stage for controlling a windfarm having a plurality of wind power installations and feeding into an electrical supply network at a network connection point, the windfarm control stage comprising:
a first input configured to receive at least one control error,
a first output configured to output at least one manipulated variable for transmission to the plurality of wind power installations,
at least one first controller configured to generate the at least one manipulated variable based on the at least one control error,
a second input for receiving one or more park signals including a farm state, wherein the one or more park signals are data signals, and are at least received from the plurality of wind power installations, wherein the one or more park signals include information on changes in the plurality of wind power installations functioning as actuators, and wherein the farm state is recorded in at least one of the plurality of wind power installations, the farm state being indicative of a state of at least one of:
a number of wind power installations installed in the windfarm;
a rated active power of each wind power installation;
a rated reactive power of each wind power installation;
a number and properties of STATCOM installations present in the windfarm;
a number and properties of battery stores present in the windfarm;
transmission properties of an internal farm network;
active and reactive power relations of each wind power installation;
an availability of each wind power installation;
an operating state of each wind power installation;
an ambient wind speed at one or more of the wind power installations;
an ambient wind direction at one or more of the wind power installations;
an ambient gustiness of wind at one or more of the wind power installations;
an ambient air density of the wind at one or more of the wind power installations;
an ambient air humidity of the wind at one or more of the wind power installations; and
an ambient temperature of the wind at one or more of the wind power installations, and
a second controller for altering at least one controller parametrization or controller structure of the at least one first controller based on the farm state in response to the changes in the plurality of wind power installations functioning as the actuators, wherein the second controller is configured to alter the at least one controller parametrization or controller structure of the at least one first controller before a start-up or during operation of the windfarm or a wind power installation of the plurality of wind power installations,
wherein the information on changes in the plurality of wind power installations functioning as actuators in the one or more park signals includes:

a present availability of active current for feeding-in for each wind power installation of the plurality of wind power installations,
a present availability of reactive current for feeding-in for each wind power installation of the plurality of wind power installations, and
a present operating state of each wind power installation of the plurality of wind power installations, the present operating state including:
presently feedable active power, and
presently feedable reactive power.

7. A wind power installation of a windfarm, comprising:
a generator,
an aerodynamic rotor coupled to the generator, the generator configured to generate electrical power from wind,
an inverter configured to generate electric current for feeding into an electrical supply network,
a connection configured to electrically connect the inverter to an internal farm network of the windfarm to feed the generated electric current into the electrical supply network at a network connection point, and
a communication device configured to communicate with a windfarm control stage or a windfarm control device to receive and implement manipulated variables from the windfarm control stage or the windfarm control device, wherein:
the wind power installation is configured to transmit, via the communication device, a signal including states of the wind power installation to the windfarm control stage or the windfarm control device to enable the windfarm control stage or the windfarm control device to alter at least one controller parametrization or controller structure of a controller of the windfarm control stage or the windfarm control device based on the transmitted states and react to changes in the wind power installation functioning as an actuator of the windfarm control stage or the windfarm control device,
the signal is a data signal and provides information on the changes in the wind power installation functioning as the actuator of the windfarm control stage or the windfarm control device, wherein a state with respect to the change is recorded in the wind power installation,
the windfarm control stage or the windfarm control device is configured to dynamically alter the at least one controller parametrization or controller structure of the controller before a start-up or during operation of the windfarm or the wind power installation, and
wherein the information on changes in a plurality of wind power installations functioning as actuators in one or more park signals includes:
a present availability of active current for feeding-in for each wind power installation of the plurality of wind power installations,
a present availability of reactive current for feeding-in for each wind power installation of the plurality of wind power installations, and
a present operating state of each wind power installation of the plurality of wind power installations, the present operating state including:
presently feedable active power, and
presently feedable reactive power.

* * * * *

UNITED STATES PATENT AND TRADEMARK OFFICE
CERTIFICATE OF CORRECTION

| | | |
|---|---|---|
| PATENT NO. | : 12,331,725 B2 | Page 1 of 1 |
| APPLICATION NO. | : 16/078910 | |
| DATED | : June 17, 2025 | |
| INVENTOR(S) | : Kai Busker | |

It is certified that error appears in the above-identified patent and that said Letters Patent is hereby corrected as shown below:

In the Claims

<u>Column 18, Claim 1, Lines 28-29:</u>
After the wording "power installations," please insert the following:
    -- and
    using the controller having altered parameterization or controller structure to control the wind farm or the wind power installation of the plurality of wind power installations, --.

<u>Column 19, Claim 2, Lines 33-34:</u>
After the wording "power installations," please insert the following:
    -- and
    using the controller having altered parameterization or controller structure to control the windfarm or the wind power installation of the plurality of wind power installations, --.

<u>Column 20, Claim 6, Lines 64-65:</u>
After the wording "power installations," please insert the following:
    -- wherein the at least one first controller having altered parameterization or controller structure is configured to control the windfarm having the plurality of wind power installations, and --.

<u>Column 22, Claim 7, Lines 17-18:</u>
Delete the word "and" and insert -- the controller having altered parameterization or controller structure is configured to control the windfarm or the wind power installation, and --.

Signed and Sealed this
Twenty-sixth Day of August, 2025

Coke Morgan Stewart
*Acting Director of the United States Patent and Trademark Office*